(12) United States Patent
Hall et al.

(10) Patent No.: US 10,330,780 B2
(45) Date of Patent: Jun. 25, 2019

(54) LIDAR BASED 3-D IMAGING WITH STRUCTURED LIGHT AND INTEGRATED ILLUMINATION AND DETECTION

(71) Applicant: Velodyne Lidar, Inc., Morgan Hill, CA (US)

(72) Inventors: David S. Hall, Los Altos Hills, CA (US); Mathew Noel Rekow, Santa Cruz, CA (US)

(73) Assignee: Velodyne Lidar, Inc., Morgan Hill, CA (US)

( * ) Notice: Subject to any disclaimer, the term of this patent is extended or adjusted under 35 U.S.C. 154(b) by 0 days.

(21) Appl. No.: 15/926,095

(22) Filed: Mar. 20, 2018

(65) Prior Publication Data

US 2018/0267151 A1    Sep. 20, 2018

Related U.S. Application Data

(60) Provisional application No. 62/473,628, filed on Mar. 20, 2017.

(51) Int. Cl.
| | |
|---|---|
| G01S 7/48 | (2006.01) |
| G01S 7/486 | (2006.01) |
| G01S 17/89 | (2006.01) |
| G01S 7/481 | (2006.01) |

(Continued)

(52) U.S. Cl.
CPC .......... *G01S 7/4861* (2013.01); *G01S 7/4811* (2013.01); *G01S 7/4816* (2013.01); *G01S 7/4817* (2013.01); *G01S 17/10* (2013.01); *G01S 17/42* (2013.01); *G01S 17/89* (2013.01); *G01S 7/4815* (2013.01)

(58) Field of Classification Search
USPC ........................................ 356/5.01
See application file for complete search history.

(56) References Cited

U.S. PATENT DOCUMENTS

| | | | |
|---|---|---|---|
| 5,847,817 A * | 12/1998 | Zediker | G01S 7/493 356/5.09 |
| 7,969,558 B2 | 6/2011 | Hall | |
| 8,675,181 B2 | 3/2014 | Hall | |

(Continued)

*Primary Examiner* — James R Hulka
(74) *Attorney, Agent, or Firm* — Spano Law Group; Joseph S. Spano

(57) ABSTRACT

Methods and systems for performing three dimensional LIDAR measurements with multiple illumination beams scanned over a three dimensional environment by one or more optical phase modulation devices are described herein. In one aspect, illumination light from each LIDAR measurement channel is emitted to the surrounding environment in a different direction by an optical phase modulation device. The optical phase modulation device also directs each amount of return measurement light onto a corresponding photodetector. The illumination pulse output of each LIDAR measurement channel is synchronized with commanded changes of state of each corresponding optical phase modulation device. In some embodiments, each optical phase modulation device is associated with a single LIDAR measurement channel. In some embodiments, multiple LIDAR measurement channels are associated with a single modulation device. In some embodiments, a one dimensional optical phase modulation device is employed. In other embodiments, a two dimensional optical phase modulation device is employed.

26 Claims, 13 Drawing Sheets

(51) Int. Cl.
*G01S 17/10* (2006.01)
*G01S 17/42* (2006.01)

(56) References Cited

U.S. PATENT DOCUMENTS

| | | | |
|---|---|---|---|
| 8,767,190 B2 | 7/2014 | Hall | |
| 9,529,079 B1* | 12/2016 | Droz | G01S 7/4861 |
| 9,964,632 B1* | 5/2018 | Droz | G01S 7/4861 |
| 10,003,168 B1* | 6/2018 | Villeneuve | G02B 26/101 |
| 10,018,726 B2* | 7/2018 | Hall | G01S 7/4811 |
| 10,094,925 B1* | 10/2018 | LaChapelle | G01S 7/483 |
| 10,109,183 B1* | 10/2018 | Franz | G08C 23/04 |
| 10,126,412 B2* | 11/2018 | Eldada | G01S 17/89 |
| 10,132,928 B2* | 11/2018 | Eldada | G01S 17/89 |
| 2010/0020306 A1* | 1/2010 | Hall | G01S 7/4813 356/5.01 |
| 2010/0302528 A1* | 12/2010 | Hall | G01C 1/04 356/5.01 |
| 2011/0216304 A1* | 9/2011 | Hall | G01S 7/4813 356/4.01 |
| 2015/0293224 A1* | 10/2015 | Eldada | G01S 7/4814 250/206.1 |
| 2016/0161600 A1* | 6/2016 | Eldada | G01S 17/89 356/5.01 |
| 2017/0269215 A1* | 9/2017 | Hall | G01S 7/4811 |
| 2018/0074382 A1* | 3/2018 | Lee | G02B 26/06 |
| 2018/0100924 A1* | 4/2018 | Brinkmeyer | G01S 17/32 |
| 2018/0284227 A1* | 10/2018 | Hall | G01S 7/484 |
| 2018/0284274 A1* | 10/2018 | LaChapelle | G01S 7/483 |
| 2018/0321360 A1* | 11/2018 | Hall | G01S 7/4811 |
| 2019/0011563 A1* | 1/2019 | Hall | G01S 17/89 |

* cited by examiner

LIDAR BASED 3-D IMAGING WITH STRUCTURED LIGHT AND INTEGRATED ILLUMINATION AND DETECTION

CROSS REFERENCE TO RELATED APPLICATION

The present application for patent claims priority under 35 U.S.C. § 119 from U.S. provisional patent application Ser. No. 62/473,628, entitled "LIDAR Based 3-D Imaging With Structured Light And Integrated Illumination And Detection," filed Mar. 20, 2017, the subject matter of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Some existing LIDAR systems employ an illumination source and a detector that are not integrated together onto a common substrate (e.g., electrical mounting board). Furthermore, the illumination beam path and the collection beam path are separated within the LIDAR device. This leads to opto-mechanical design complexity and alignment difficulty.

In addition, mechanical devices employed to scan the illumination beams in different directions may be sensitive to mechanical vibrations, inertial forces, and general environmental conditions. Without proper design these mechanical devices may degrade leading to loss of performance or failure.

Improvements in the opto-mechanical design of LIDAR systems are desired, while maintaining high levels of imaging resolution and range.

SUMMARY

Methods and systems for performing three dimensional LIDAR measurements with multiple illumination beams scanned over a three dimensional environment by one or more optical phase modulation devices are described herein.

In some embodiments, a LIDAR measurement system includes a master controller and one or more integrated LIDAR measurement devices including a return signal receiver integrated circuit, an illumination driver integrated circuit, an illumination source, a photodetector assembly, and a trans-impedance amplifier. Each of these elements is mounted to a common substrate (e.g., printed circuit board) that provides mechanical support and electrical connectivity among the elements.

The illumination source emits a measurement pulse of illumination light. The illumination light reflects from an object in the surrounding three dimensional environment under measurement. A portion of the reflected light is collected as return measurement light associated with the measurement pulse.

In one aspect, the illumination light emitted from an integrated LIDAR measurement device and the corresponding return measurement light directed toward the integrated LIDAR measurement device share a common optical path.

In some embodiments, the illumination light generated by the illumination source of an integrated LIDAR measurement device is injected into a reception cone of the corresponding detector by a fiber waveguide.

In another aspect, the illumination light is directed toward a particular location in the surrounding environment by one or more optical phase modulation devices (e.g., optical phase modulation device) of the LIDAR measurement system. Similarly, the return measurement light is directed onto the corresponding photodetector by the one or more optical phase modulation devices of the LIDAR measurement system. The optical phase modulation device is disposed in the optical path between the integrated LIDAR measurement device and the environment under measurement. The optical phase modulation device effectively expands the field of view and increases the sampling density within the field of view of the 3-D LIDAR system.

A computing system communicates command signals to each optical phase modulation device that cause the optical phase modulation device to redirect incident light in the desired direction. In addition, the computing system communicates signals to each integrated LIDAR measurement device to synchronize the illumination pulse output of each integrated LIDAR measurement device with the changes of state commanded to each corresponding optical phase modulation device. In this manner, the measurement pulses generated by each integrated LIDAR measurement device are scanned through the surrounding environment in a predictable, controlled manner so that the portion of the surrounding environment interrogated by each measurement pulse generated by the integrated LIDAR measurement device is known.

In general, a LIDAR measurement system may include any number of measurement channels including an integrated LIDAR measurement device and an optical phase modulation device.

In some embodiments, each optical phase modulation device is associated with a single integrated LIDAR measurement device to form a single measurement channel. However, in some other embodiments, an optical phase modulation device is associated with multiple integrated LIDAR measurement devices. In these embodiments, multiple measurement channels are optically integrated in a single optical phase modulation device.

In some embodiments, the optical phase modulation device is a one dimensional optical phase modulation device. Thus, the illumination beams and collection beams are focused to one dimension before interaction with the optical phase modulation device. However, in some other embodiments, a two dimensional optical phase modulation device is employed. In these embodiments, the illumination and collection beams may interact with the optical phase modulation device in both optical dimensions. In these embodiments, it is not necessary to focus the illumination and collection beams to one dimension.

In a further aspect, each integrated LIDAR measurement device and corresponding optical phase modulation device is mounted to a rotating frame that rotates with respect to a base frame of a LIDAR system. The interaction of the beam of illumination light with the optical phase modulation device scans the illumination beam into the surrounding environments in different directions in addition to the nominal movement of the illumination beam provided by the motion of the integrated LIDAR measurement device relative to the based frame of the LIDAR system.

In another further aspect, the time of flight is determined based on the time elapsed between the detection of a detected pulse due to internal cross-talk between the illumination source and photodetector and a valid return pulse. In this manner, systematic delays are eliminated from the estimation of time of flight.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
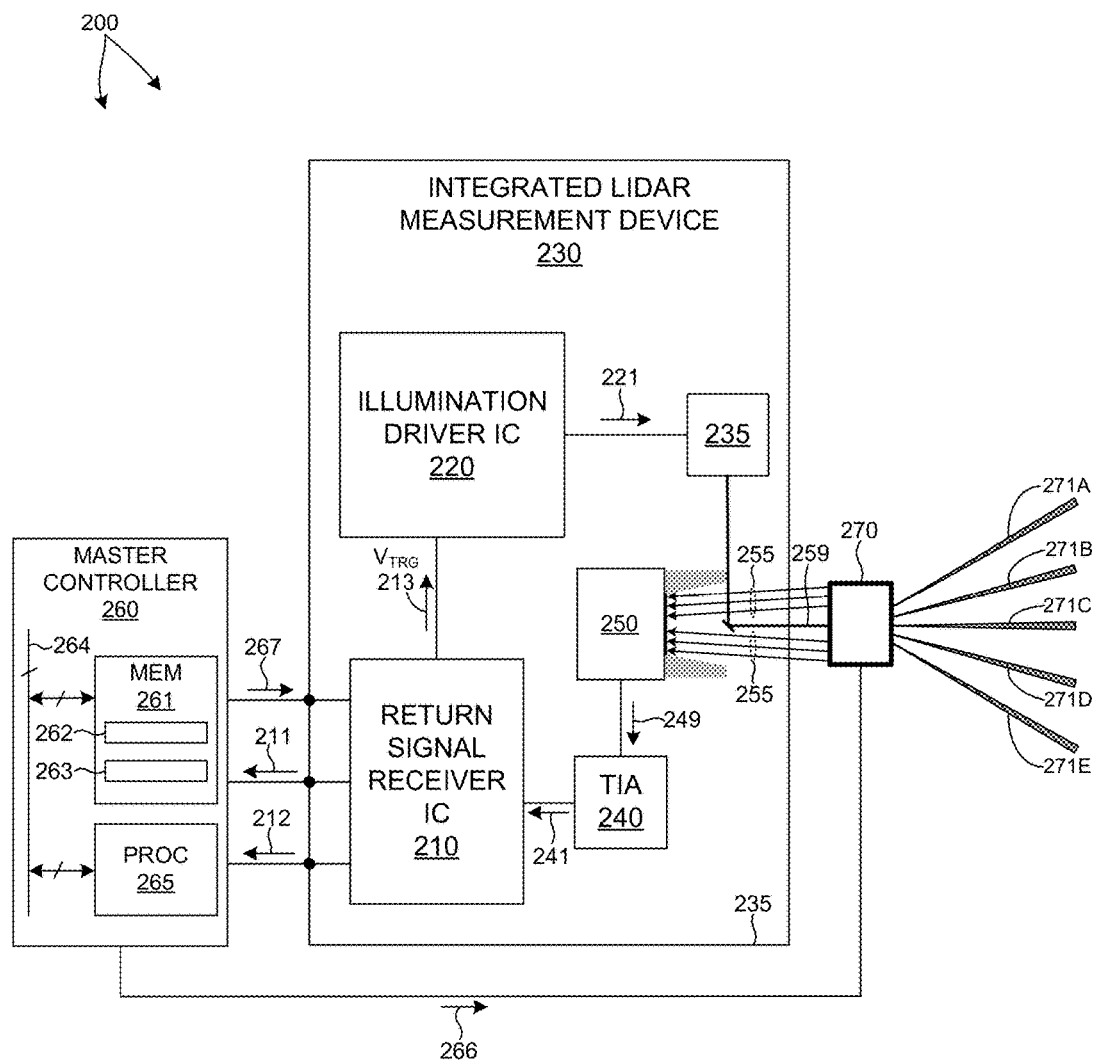
FIG. 1 is a simplified diagram illustrative of one embodiment of a 3-D LIDAR system 200 in at least one novel aspect.

FIG. 1 depicts an LIDAR measurement system 200 in one embodiment. LIDAR measurement system 200 includes a master controller 260 and one or more integrated LIDAR measurement devices 230. An integrated LIDAR measurement device 230 includes a return signal receiver integrated circuit (IC) 210, an illumination driver integrated circuit (IC) 220, an illumination source 235, a photodetector assembly 250, and a trans-impedance amplifier (TIA) 240. Each of these elements is mounted to a common substrate 235 (e.g., printed circuit board) that provides mechanical support and electrical connectivity among the elements.

Illumination source 235 emits a measurement pulse of illumination light 259 in response to a pulse of electrical current 221. In some embodiments, the illumination source 235 is laser based (e.g., laser diode). In some embodiments, the illumination source is based on one or more light emitting diodes. In general, any suitable pulsed illumination source may be contemplated. Illumination light 259 exits LIDAR measurement system 200 and reflects from an object in the surrounding three dimensional environment under measurement. A portion of the reflected light is collected as return measurement light 255 associated with the measurement pulse 259. As depicted in FIG. 1, illumination light 259 emitted from integrated LIDAR measurement device 230 and corresponding return measurement light 255 directed toward the integrated LIDAR measurement device share a common optical path on the integrated LIDAR measurement device 230 before exiting the integrated LIDAR measurement device 230 into the surrounding environment.

In one aspect, the illumination light 259 is directed toward a particular location in the surrounding environment by one or more optical phase modulation devices (e.g., optical phase modulation device 270) of LIDAR measurement system 100. In a further aspect, the return measurement light 255 is directed and focused onto photodetector 250 by the one or more optical phase modulation devices of LIDAR measurement system 100. The optical phase modulation device is disposed in the optical path between the integrated LIDAR measurement device 230 and the environment under measurement. The optical phase modulation device effectively expands the field of view and increases the sampling density within the field of view of the 3-D LIDAR system.

As depicted in FIG. 1, command signals 266 generated by master controller 260 are communicated from master controller 260 to the optical phase modulation device 270. In response, optical phase modulation device 270 changes state and diffracts illumination beam 259 in accordance with a desired direction. For example, as depicted in FIG. 1, optical phase modulation device 270 diffracts illumination beam 259 into one of five different directions (e.g., directions 271A-E) depending on the commanded state of optical phase modulation device 270.

Figure 5:
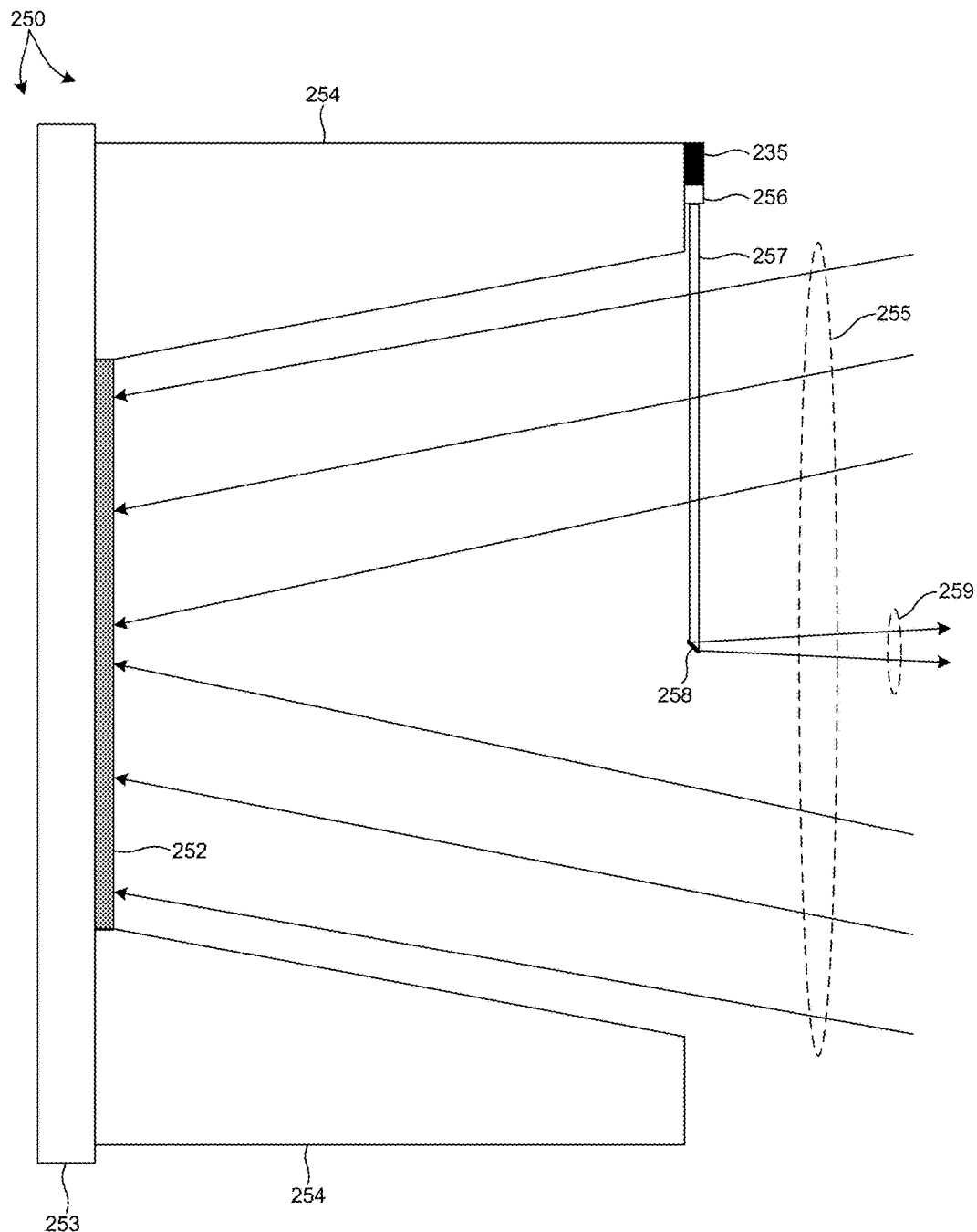
FIG. 5 depicts a simplified illustration of photodetector assembly 250 in further detail.

FIG. 5 depicts a simplified illustration of photodetector assembly 250 in further detail. Photodetector assembly 250 includes a detector 253 having an active area 252. As depicted in FIG. 5, pulsed light emitting device 230 is located outside the field of view of the active area 252 of the detector. As depicted in FIG. 5, an overmold 254 is mounted over the detector. The overmold 254 includes a conical cavity that corresponds with the ray acceptance cone of return light 255. In one aspect, illumination light 259 from illumination source 235 is injected into the detector reception cone by a fiber waveguide 257. An optical coupler 256 optically couples illumination source 235 (e.g., array of laser diodes) with fiber waveguide 257. At the end of the fiber waveguide 257, a mirror element 258 is oriented at a 45 degree angle with respect to the waveguide to inject the illumination light 259 into the cone of return light 255. In one embodiment, the end faces of fiber waveguide 257 are cut at a 45 degree angle and the end faces are coated with a highly reflective dielectric coating to provide a mirror surface. In some embodiments, waveguide 257 includes a rectangular shaped glass core and a polymer cladding of lower index of refraction. In some embodiments, the entire assembly 250 is encapsulated with a material having an index of refraction that closely matches the index of refraction of the polymer cladding. In this manner, the waveguide injects the illumination light 259 into the acceptance cone of return light 255 with minimal occlusion. In addition, the injection of the illumination light 259 into the acceptance cone of return light 259 ensures that the illumination light 259 emitted from integrated LIDAR measurement device 230 and corresponding return measurement light 255 directed toward the integrated LIDAR measurement device share a common optical path on the integrated LIDAR measurement device 230 before exiting the integrated LIDAR measurement device 230 into the surrounding environment.

The placement of the waveguide 257 within the acceptance cone of the return light projected onto the active sensing area 252 of detector 253 is selected to ensure that the illumination spot and the detector field of view have maximum overlap in the far field.

As depicted in FIG. 1, return light 255 reflected from the surrounding environment is detected by photodetector 250. In some embodiments, photodetector 250 includes an avalanche photodiode. Photodetector 250 generates an output signal 249 that is amplified by an analog trans-impedance amplifier (TIA) 240. However, in general, the amplification of output signal 249 may include multiple, amplifier stages. In this sense, an analog trans-impedance amplifier is provided by way of non-limiting example, as many other analog signal amplification schemes may be contemplated within the scope of this patent document. Although TIA 240 is depicted in FIG. 1 as a discrete device separate from the return signal receiver IC 210, in general, TIA 2400 may be integrated with receiver IC 210. In some embodiments, it is preferable to integrate TIA 240 with receiver IC 210 to save space and reduce signal contamination.

The amplified signal 241 is communicated to return signal receiver IC 210. Receiver IC 210 includes timing circuitry and a time-to-digital converter that estimates the time of flight of the measurement pulse from illumination source 235, to a reflective object in the three dimensional environment, and back to the photodetector 250. A signal 211 indicative of the estimated time of flight is communicated to master controller 260 for further processing and communication to a user of the LIDAR measurement system 200. In addition, return signal receiver IC 210 is configured to digitize segments of the return signal 241 that include peak values (i.e., return pulses), and communicate signals 212 indicative of the digitized segments to master controller 260. In some embodiments, master controller 260 processes these signal segments to identify properties of the detected object. In some embodiments, master controller 260 communicates signals 212 to a user of the LIDAR measurement system 200 for further processing.

Master controller 260 is configured to generate a pulse command signal 267 that is communicated to receiver IC 210 of integrated LIDAR measurement device 230. Pulse command signal 267 is a digital signal generated by master controller 260. Thus, the timing of pulse command signal 267 is determined by a clock associated with master controller 260. In some embodiments, the pulse command signal 267 is directly used to trigger pulse generation by illumination driver IC 220 and data acquisition by receiver IC 210. However, illumination driver IC 220 and receiver IC 210 do not share the same clock as master controller 260. For this reason, precise estimation of time of flight becomes much more computationally tedious when the pulse command signal 267 is directly used to trigger pulse generation and data acquisition.

In general, a LIDAR measurement system includes a number of different integrated LIDAR measurement devices 230 each emitting a pulsed beam of illumination light from the LIDAR device into the surrounding environment and measuring return light reflected from objects in the surrounding environment.

In these embodiments, master controller 260 communicates a pulse command signal 267 to each different integrated LIDAR measurement device. In this manner, master controller 260 coordinates the timing of LIDAR measurements performed by any number of integrated LIDAR measurement devices. In a further aspect, one or more optical phase modulation devices are in the optical path of the illumination pulses and return measurement pulses associated with each of the integrated LIDAR measurement devices. In this manner, one or more optical phase modulation devices directs each illumination pulse and return measurement pulse of LIDAR measurement system 200.

In the depicted embodiment, receiver IC 210 receives pulse command signal 267 and generates a pulse trigger signal, $V_{TRG}$ 213, in response to the pulse command signal 267. Pulse trigger signal 213 is communicated to illumination driver IC 220 and directly triggers illumination driver IC 220 to provide a pulse 221 of electrical power to illumination source 235, causing illumination source 235 to emit a pulse of illumination light 259. In addition, pulse trigger signal 213 directly triggers data acquisition of return signal 241 and associated time of flight calculation. In this manner, pulse trigger signal 213 generated based on the internal clock of receiver IC 210 is employed to trigger both pulse generation and return pulse data acquisition. This ensures precise synchronization of pulse generation and return pulse acquisition which enables precise time of flight calculations by time-to-digital conversion.

Figure 2:
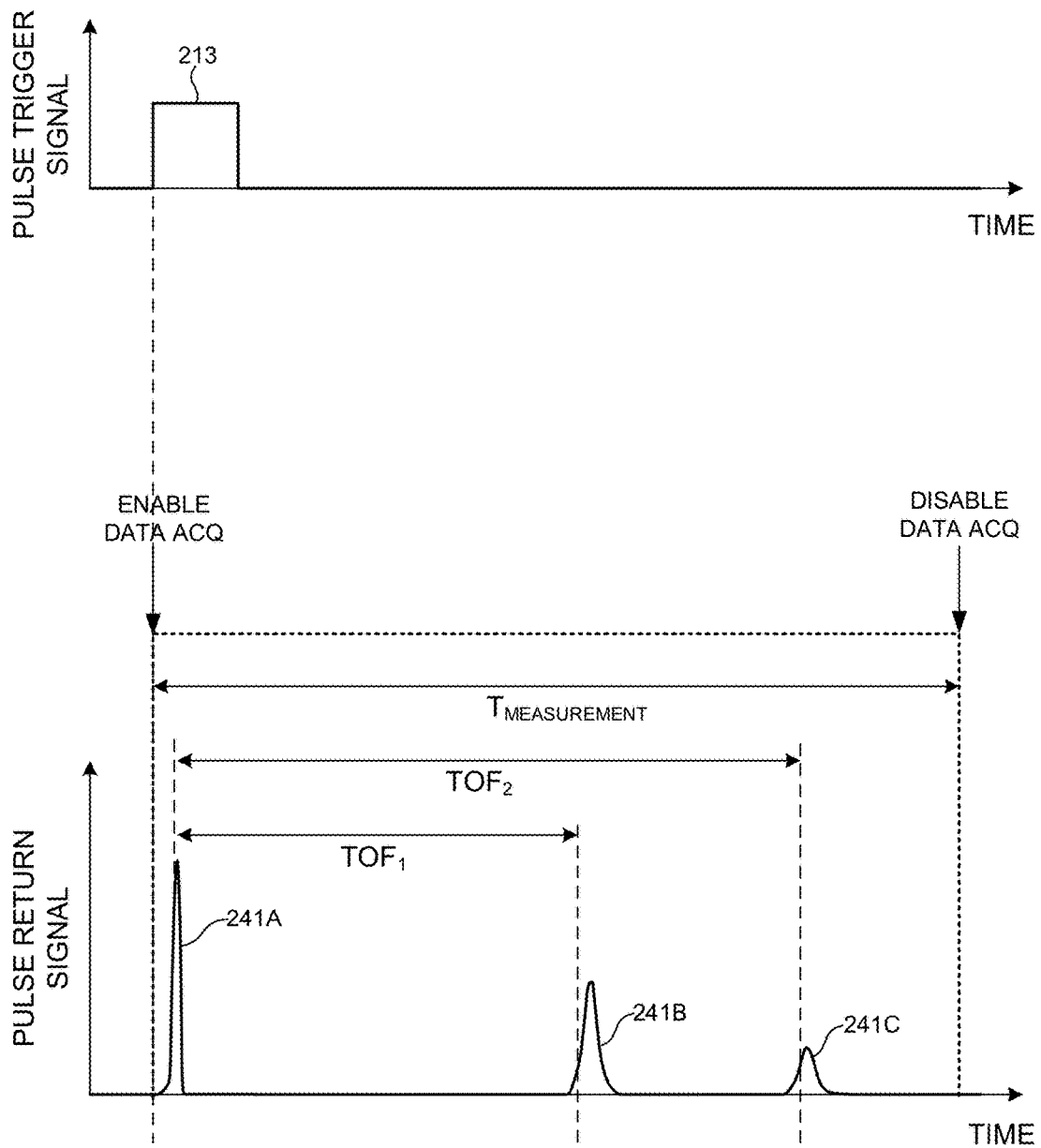
FIG. 2 depicts an illustration of the timing of emission of a pulsed measurement beam and capture of the returning measurement pulse.

FIG. 2 depicts an illustration of the timing associated with the emission of a measurement pulse from an integrated LIDAR measurement device 230 and capture of the returning measurement pulse. As depicted in FIG. 2, a measurement is initiated by the rising edge of pulse trigger signal 213 generated by receiver IC 210. As depicted in FIGS. 1 and 2, an amplified, return signal 241 is received by receiver IC 210. A measurement window (i.e., a period of time over which collected return signal data is associated with a particular measurement pulse) is initiated by enabling data acquisition at the rising edge of pulse trigger signal 213. Receiver IC 210 controls the duration of the measurement window, $T_{measurement}$, to correspond with the window of time when a return signal is expected in response to the emission of a measurement pulse sequence. In some examples, the measurement window is enabled at the rising edge of pulse trigger signal 213 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 241 includes three return measurement pulses that correspond with the emitted measurement pulse. In general, signal detection is performed on all detected measurement pulses. Further signal analysis may be performed to identify the closest valid signal 241B (i.e., first valid instance of the return measurement pulse), the strongest signal, and the furthest valid signal 241C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 213 and each valid return pulse (i.e., 241B and 241C) introduces undesireable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, receiver IC 210 measures time of flight based on the time elapsed between the detection of a detected pulse 241A due to internal cross-talk between the illumination source 235 and photodetector 250 and a valid return pulse (e.g., 241B and 241C). In this manner, systematic delays are eliminated from the estimation of time of flight. Pulse 241A is generated by internal cross-talk with effectively no distance of light propagation. Thus, the delay in time from the rising edge of the pulse trigger signal and the instance of detection of pulse 241A captures all of the systematic delays associated with illumination and signal detection. By measuring the time of flight of valid return pulses (e.g., return pulses 241B and 241C) with reference to detected pulse 241A, all of the systematic delays associated with illumination and signal detection due to internal cross-talk are eliminated. As depicted in FIG. 2, receiver IC 210 estimates the time of flight, $TOF_1$, associated with return pulse 241B and the time of flight, $TOF_2$, associated with return pulse 241C with reference to return pulse 241A.

In some embodiments, the signal analysis is performed by receiver IC 240, entirely. In these embodiments, signals 211 communicated from integrated LIDAR measurement device 230 include an indication of the time of flight determined by receiver IC 210. In some embodiments, signals 212 include digitized segments of return signal 241 generated by receiver IC 210. These raw measurement signal segments are processed further by one or more processors located on board the 3-D LIDAR system, or external to the 3-D LIDAR system to arrive at another estimate of distance, an estimate of one of more physical properties of the detected object, or a combination thereof.

Figure 3:
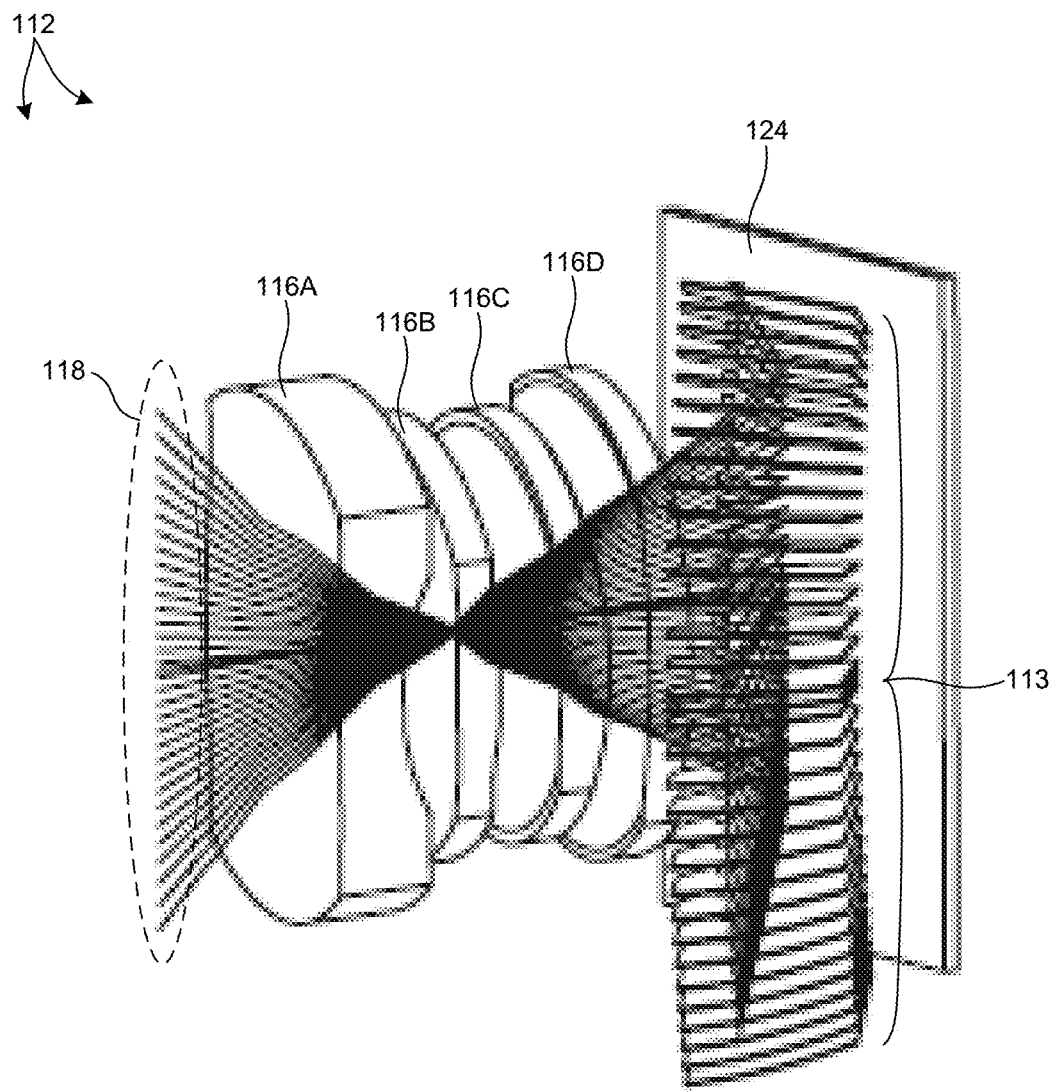
FIG. 3 depicts a view of light emission/collection engine 112 of a 3-D LIDAR system.

FIG. 3 depicts a light emission/collection engine 112 in one embodiment. Light emission/collection engine 112 includes an array of integrated LIDAR measurement devices 113. Each integrated LIDAR measurement device includes a light emitting element, a light detecting element, and associated control and signal conditioning electronics integrated onto a common substrate (e.g., electrical board).

Light emitted from each integrated LIDAR measurement device passes through beam shaping optical elements 116 that collimate the emitted light to generate a beam of illumination light projected from the 3-D LIDAR system into the environment. In this manner, an array of beams of light 118, each emitted from a different LIDAR measurement device are emitted from 3-D LIDAR system 100 as depicted in FIG. 3. In general, any number of LIDAR measurement devices can be arranged to simultaneously emit any number of light beams from 3-D LIDAR system 100. Light reflected from an object in the environment due to its illumination by a particular LIDAR measurement device is collected by beam shaping optical elements 116. The collected light passes through beam shaping optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 4:
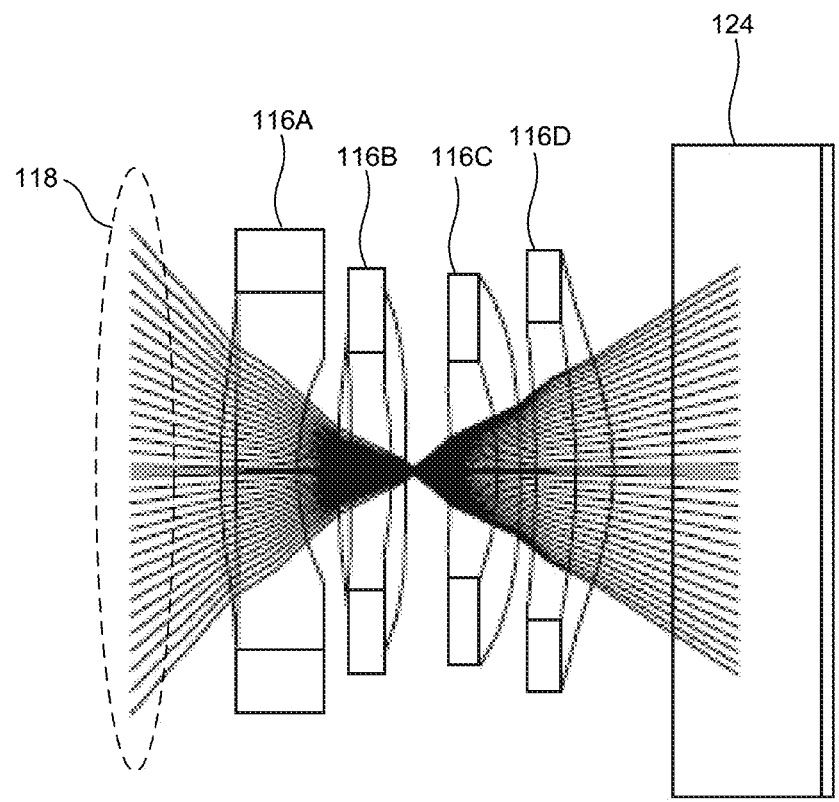
FIG. 4 depicts a view of collection optics 116 of a 3-D LIDAR system in greater detail.

FIG. 4 depicts a view of beam shaping optical elements 116 in greater detail. As depicted in FIG. 4, beam shaping optical elements 116 include four lens elements 116A-D arranged to focus collected light 118 onto each detector of the array of integrated LIDAR measurement devices 113. In the embodiment depicted in FIG. 4, light passing through optics 116 is reflected from mirror 124 and is directed onto each detector of the array of integrated LIDAR measurement devices. In some embodiments, one or more of the beam shaping optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

In a further aspect, one or more integrated LIDAR measurement devices are in optical communication with an optical phase modulation device that directs the illumination beam(s) generated by the one or more integrated LIDAR measurement devices in different directions. The optical phase modulation device is an active device that receives a control signal that causes the optical phase modulation device to change state and thus change the direction of light diffracted from the optical phase modulation device. In this manner, the illumination beam(s) generated by the one or more integrated LIDAR devices are scanned through a number of different orientations and effectively interrogate the surrounding 3-D environment under measurement. The diffracted beams projected into the surrounding environment interact with objects in the environment. Each respective integrated LIDAR measurement device measures the distance between the LIDAR measurement system and the detected object based on return light collected from the object. The optical phase modulation device is disposed in the optical path between the integrated LIDAR measurement device and an object under measurement in the surrounding environment. Thus, both illumination light and corresponding return light pass through the optical phase modulation device.

Figure 6:
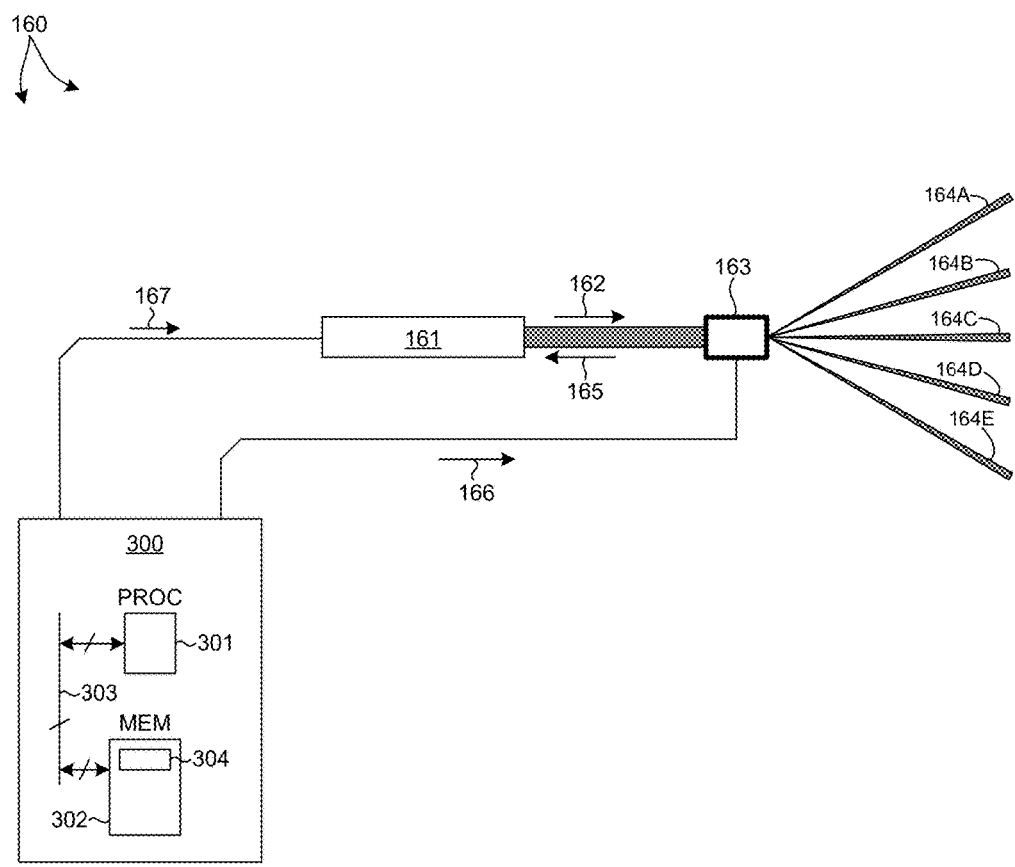
FIG. 6 depicts an embodiment 160 of a 3-D LIDAR system employing an optical phase modulation device in one embodiment.

FIG. 6 depicts a scanning LIDAR system 160 employing an optical phase modulation device in one embodiment. Scanning LIDAR system 160 includes an integrated LIDAR measurement device 161, a computing system 300, and an actively controlled optical phase modulation device 163. A beam of illumination light 162 generated by integrated LIDAR measurement device 161 propagates toward optical phase modulation device 163. Depending on the physical state of optical phase modulation device 163, the illumination beam is diffracted in any one of a number of different directions (e.g., directions 164A-E depicted in FIG. 6). Return light 165 reflected from and object in the surrounding environment passes through optical phase modulation device 163 and is detected by integrated LIDAR measurement device 161. In some embodiments, integrated LIDAR measurement device 161 determines the distance between LIDAR measurement system 160 and the detected object as described hereinbefore. In some embodiments, the computed distance is communicated to computing system 300.

As depicted in FIG. 6, computing system 300 communicates signals 166 to optical phase modulation device 163. Signals 166 cause optical phase modulation device 163 to change state such that the illumination beam 162 is diffracted in a desired direction. In addition, computing system 300 communicates signals 167 to integrated LIDAR measurement device 161 that synchronize the illumination pulse output of integrated LIDAR measurement device 161 with the changes of state of optical phase modulation device 163 commanded by signals 166. In this manner, the measurement pulses generated by integrated LIDAR measurement device 161 are scanned through the surrounding environment in a predictable, controlled manner so that the portion of the surrounding environment interrogated by each measurement pulse generated by the integrated LIDAR measurement device 161 is known by computing system 300.

Figure 7:
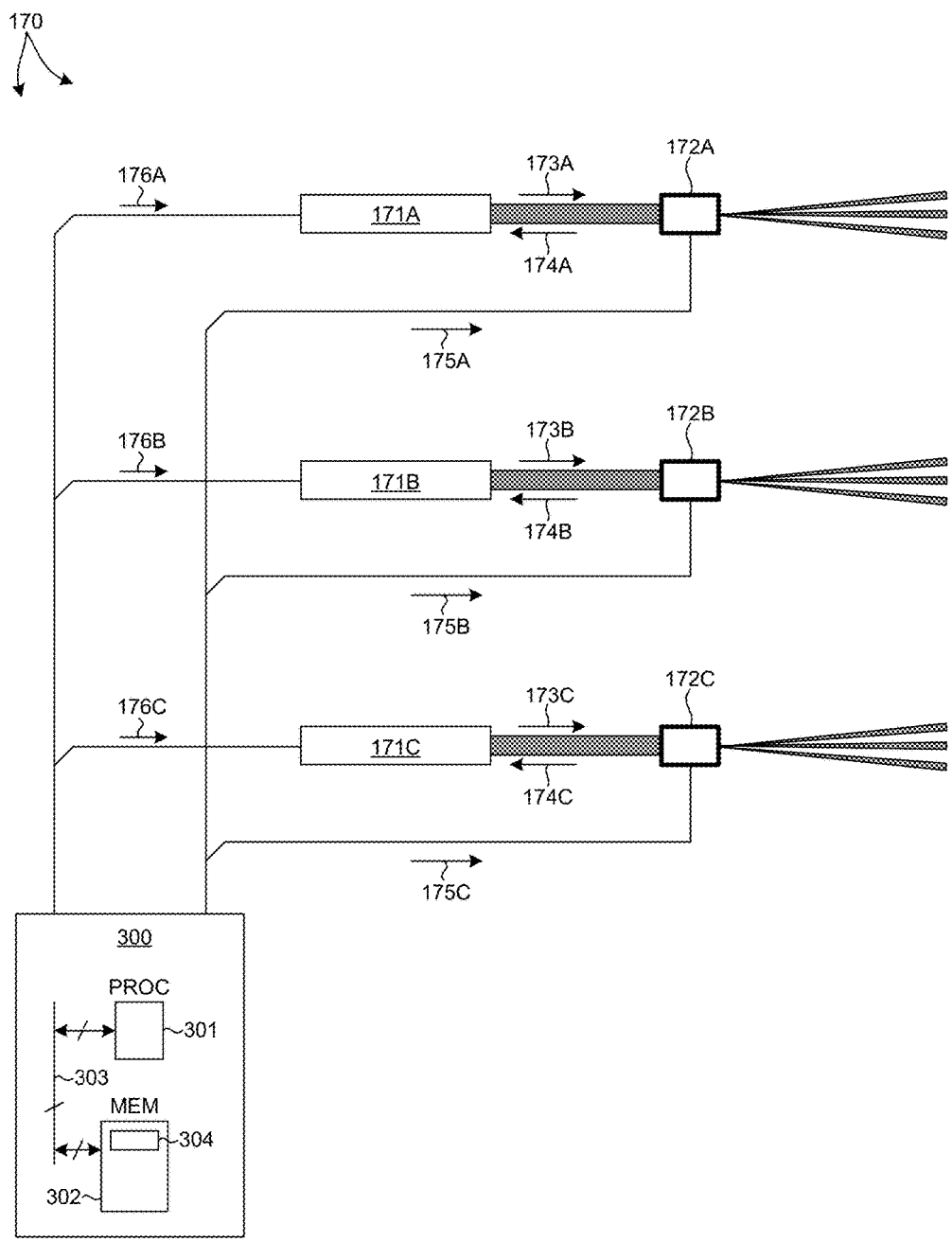
FIG. 7 depicts an embodiment 170 of a 3-D LIDAR system employing multiple optical phase modulation devices in another embodiment.

FIG. 7 depicts a scanning LIDAR system 170 employing an optical phase modulation device in another embodiment. Scanning LIDAR system 170 includes several integrated LIDAR measurement devices 171A-C, such as device 230 depicted in FIG. 1, computing system 300, and actively controlled optical phase modulation devices 172A-C. Beams of illumination light 173A-C generated by integrated LIDAR measurement devices 172A-C propagate toward optical phase modulation devices 172A-C, respectively. Depending on the physical state of optical phase modulation devices 172A-C, the illumination beams are diffracted in any one of a number of different directions in accordance with command signals 175A-C. Return light 174A-C reflected from one or more objects in the surrounding environment pass through optical phase modulation devices 172A-C and are detected by integrated LIDAR measurement devices 171A-C, respectively. In some embodiments, each integrated LIDAR measurement device 171A-C determines the distance between LIDAR measurement system 170 and the detected object as described hereinbefore. In some embodiments, the computed distance is communicated to computing system 300.

As depicted in FIG. 7, computing system 300 communicates signals 175A-C to optical phase modulation devices 172A-C, respectively. Signals 175A-C cause optical phase modulation devices 172A-C to change state such that the incident illumination beams 173A-C are diffracted in a programmed direction. In addition, computing system 300 communicates signals 176A-C to integrated LIDAR measurement devices 171A-C to synchronize the illumination pulse output of each integrated LIDAR measurement device with the changes of state of each corresponding optical phase modulation device. In this manner, the measurement pulses generated by each integrated LIDAR measurement device 171A-C are scanned through the surrounding environment in a predictable, controlled manner so that the portion of the surrounding environment interrogated by each measurement pulse generated by the integrated LIDAR measurement device 171A-C is known by computing system 300.

As depicted in FIG. 7, three optical phase modulation devices and corresponding integrated LIDAR measurement devices are illustrated. However, in general, a LIDAR measurement system may include any number of measurement channels including an integrated LIDAR measurement device and an optical phase modulation device.

In the embodiments depicted in FIGS. 6 and 7, each optical phase modulation device is associated with a single integrated LIDAR measurement device to form a single measurement channel. However, in some other embodiments, an optical phase modulation device is associated with multiple integrated LIDAR measurement devices. In these embodiments, multiple measurement channels are optically integrated in a single optical phase modulation device.

Figure 8:
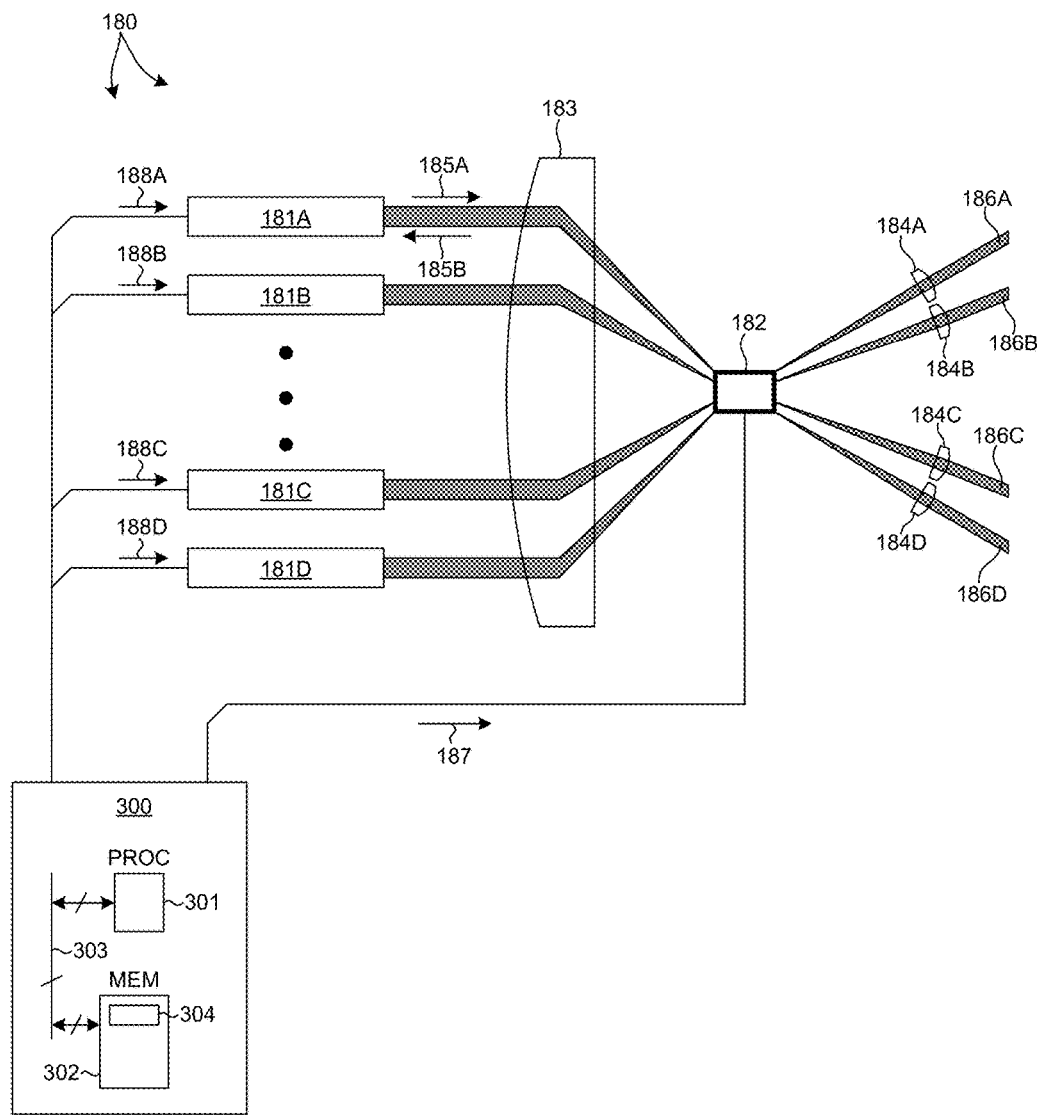
FIG. 8 depicts an embodiment 180 of a 3-D LIDAR system employing a multiple input optical phase modulation device in another embodiment.

FIG. 8 depicts a scanning LIDAR system 180 employing an optical phase modulation device in another embodiment. Scanning LIDAR system 180 includes several integrated LIDAR measurement devices 181A-D, such as device 230 depicted in FIG. 1, computing system 300, and an actively controlled optical phase modulation device 182. Beams of illumination light generated by integrated LIDAR measurement devices 181A-D propagate toward optical phase modulation device 182. For example, illumination beam 185A propagates from LIDAR measurement device 181A toward optical phase modulation device 182. In the embodiment depicted in FIG. 8, each illumination beam is focused along one axis (i.e., parallel with the drawing page) by focusing optic 183. In the other axis (i.e., perpendicular to the drawing page) the illumination beam is not focused. Thus, at incidence with optical phase modulation device 182, each illumination beam is a line shaped beam extending perpendicular to the drawing page. Depending on the physical state of optical phase modulation device 182, the illumination beams are diffracted in any one of a number of different directions in accordance with command signals 187. The diffracted beams 186A-D propogate into the surrounding environment. Each diffracted beam passes through a condensing optic (e.g., condensing optics 184A-D) to collimate the diverging diffracted beams along an optical axis parallel to the drawing paper. Return light reflected from one or more objects in the surrounding environment passes through optical phase modulation device 182 and is detected by each corresponding integrated LIDAR measurement device. In some embodiments, each integrated LIDAR measurement device 181A-D determines the distance between LIDAR measurement system 180 and the detected object(s) as described hereinbefore. In some embodiments, the computed distance is communicated to computing system 300.

In the embodiment depicted in FIG. 8, the optical phase modulation device 182 is a one dimensional optical phase modulation device. Thus, the illumination beams and collection beams are focused to one dimension before interaction with optical phase modulation device 182. In some other embodiments, a two dimensional optical phase modulation device is employed. In these embodiments, the illumination and collection beams may interact with the optical phase modulation device in both optical dimensions. In these embodiments, it is not necessary to focus the illumination and collection beams to one dimension.

As depicted in FIG. 8, computing system 300 communicates command signals 187 to optical phase modulation device 182. Signals 187 cause optical phase modulation device 182 to change state such that the incident illumination beams are diffracted in a programmed direction. In addition, computing system 300 communicates signals 188A-D to integrated LIDAR measurement devices 181A-D to synchronize the illumination pulse output of each integrated LIDAR measurement device with the changes of state of each corresponding optical phase modulation device. In this manner, the measurement pulses generated by each integrated LIDAR measurement device 181A-D are scanned through the surrounding environment in a predictable, controlled manner so that the portion of the surrounding environment interrogated by each measurement pulse generated by the integrated LIDAR measurement device 181A-D is known by computing system 300.

As depicted in FIG. 8, four integrated LIDAR measurement devices are illustrated. However, in general, a LIDAR measurement system may include any number of integrated LIDAR measurement devices illuminating an optical phase modulation device.

Any suitable optical phase modulation device may be employed in the LIDAR measurement systems described herein. Exemplary optical phase modulation devices include a phase array such as a Grating Light Valve™ manufactured by Silicon Light Machines, Sunnyvale, Calif. (USA), a microelectromechanical (MEMS) based phase modulation device such as a Digital Light Processing (DLP) unit, a liquid crystal on silicon (LCoS) modulator, a transmissive liquid crystal phase array, a reflective liquid crystal phase array, etc.

FIGS. 6-8 depict scanning LIDAR systems employing at least one optical phase modulation device in different embodiments. In some examples, these different embodiments are implemented as part of the LIDAR measurement system 200 described with reference to FIG. 1. In one embodiment, master controller 260 communicates command signals 166 to optical phase modulation device 163 to control the state of optical phase modulation device 163 and communicates signals 167 to integrated LIDAR measurement device 161 to synchronize the illumination pulse output of integrated LIDAR measurement device 161 with the changes of state of optical phase modulation device 163. Similarly, in another embodiment, master controller 260 communicates command signals 175A-C to optical phase modulation devices 172A-C, respectively, to control the state of optical phase modulation devices 172A-C and communicates signals 176A-C to integrated LIDAR measurement devices 171A-C, respectively, to synchronize the illumination pulse output of integrated LIDAR measurement devices 171A-C with the changes of state of optical phase modulation devices 172A-C. Similarly, in another embodiment, master controller 260 communicates command signals 187 to optical phase modulation device 182 to control the state of optical phase modulation device 182 and communicates signals 188A-D to integrated LIDAR measurement devices 181A-D, respectively, to synchronize the illumination pulse output of integrated LIDAR measurement devices 181A-D with the changes of state of optical phase modulation device 182.

As described herein, a LIDAR measurement system includes one or more integrated LIDAR measurement devices each emitting a pulsed beam of illumination light from the LIDAR device into the surrounding environment and measuring return light reflected from objects in the surrounding environment. Moreover, the LIDAR measurement system includes one or more optical phase modulation devices to control the direction of one or more illumination beams emitted from the LIDAR measurement system.

In a some embodiments, the integrated LIDAR measurement devices and optical phase modulation devices are rotated with respect to a base frame of a LIDAR measurement system to further increase the field of view, sampling density, or both field of view and sampling density of the 3-D LIDAR system.

Figure 9:
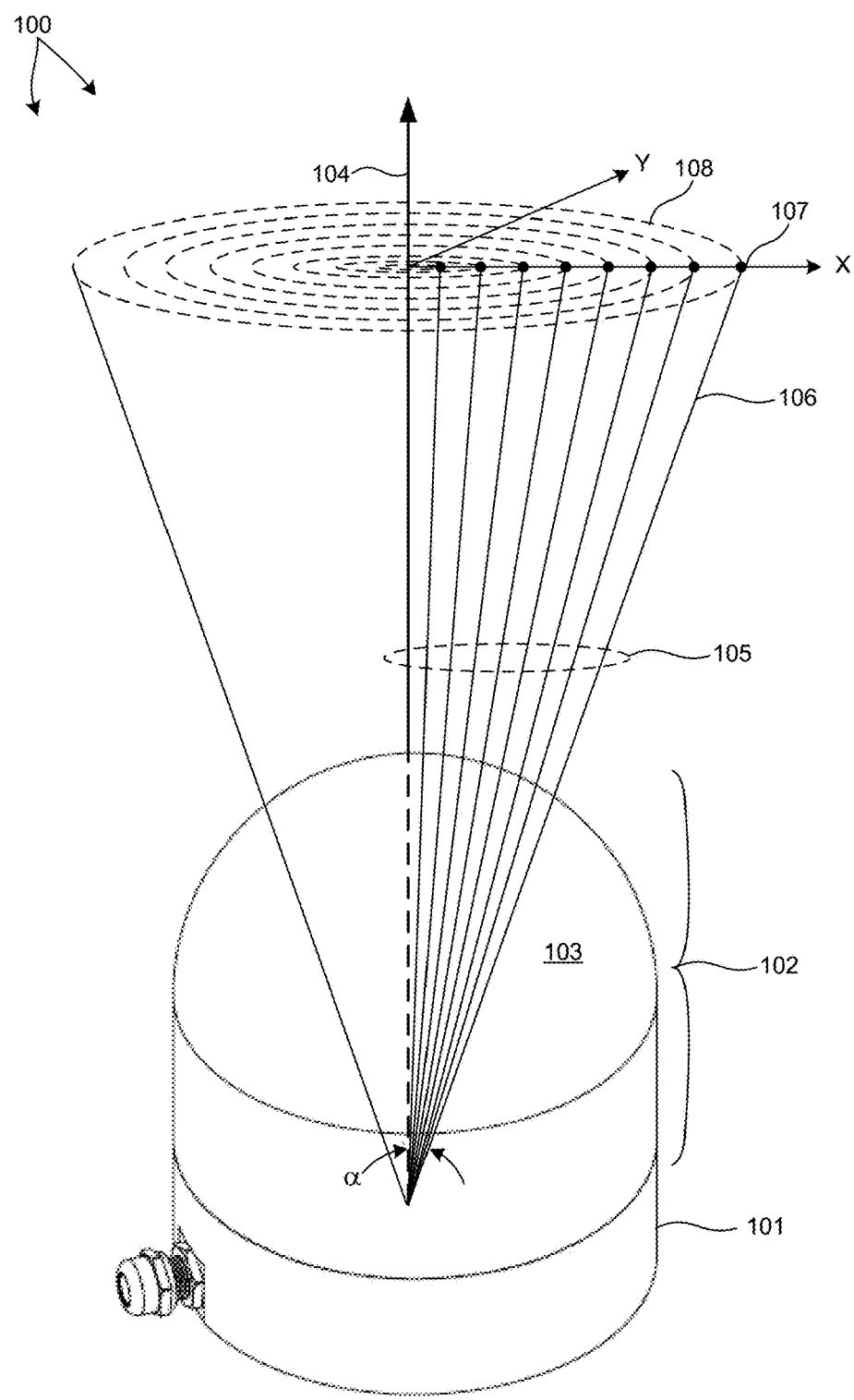
FIG. 9 depicts a rotating LIDAR measurement device 100 in one embodiment.

FIG. 9 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelength centered at 905 nanometers.

As depicted in FIG. 9, a plurality of beams of light 105 are emitted from 3-D LIDAR system 100 through domed shell element 103 over an angular range, a, measured from a central axis 104. In the embodiment depicted in FIG. 9, each beam of light is projected onto a plane defined by the x and y axes at a plurality of different locations spaced apart from one another. For example, beam 106 is projected onto the xy plane at location 107.

In the embodiment depicted in FIG. 9, 3-D LIDAR system 100 is configured to scan each of the plurality of beams of light 105 by rotation about central axis 104. Each beam of light projected onto the xy plane traces a circular pattern centered about the intersection point of the central axis 104 and the xy plane. For example, over time, beam 106 projected onto the xy plane traces out a nominal circular trajectory 108 centered about central axis 104.

Figure 10:
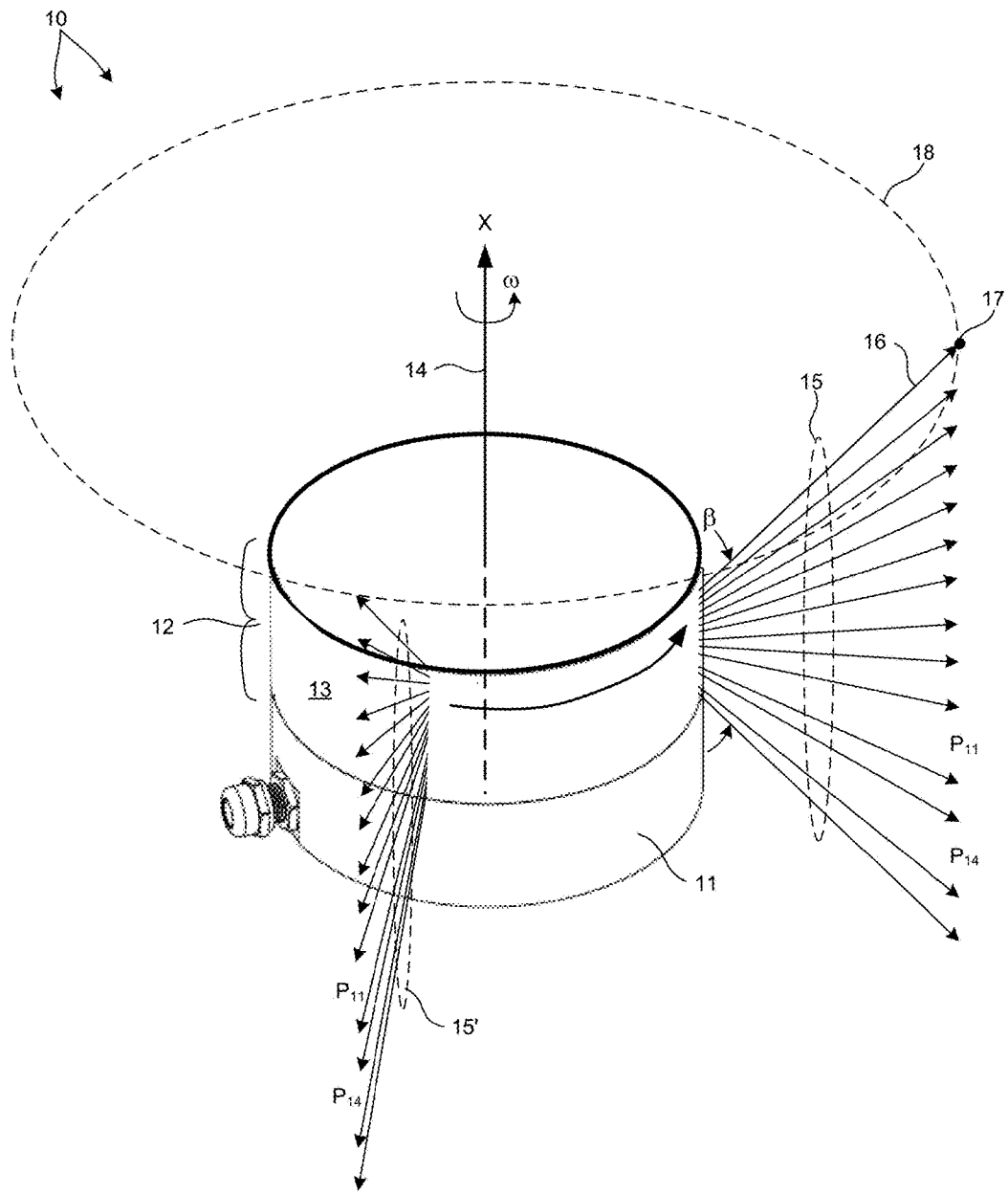
FIG. 10 depicts a rotating LIDAR measurement device 100 in another embodiment.

FIG. 10 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelength centered at 905 nanometers.

As depicted in FIG. 10, a plurality of beams of light 15 are emitted from 3-D LIDAR system 10 through cylindrical shell element 13 over an angular range, β. In the embodiment depicted in FIG. 10, the chief ray of each beam of light is illustrated. Each beam of light is projected outward into the surrounding environment in a plurality of different directions. For example, beam 16 is projected onto location 17 in the surrounding environment. Each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 10, 3-D LIDAR system 10 is configured to scan each of the plurality of beams of light 15 by rotation about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

Figure 11:
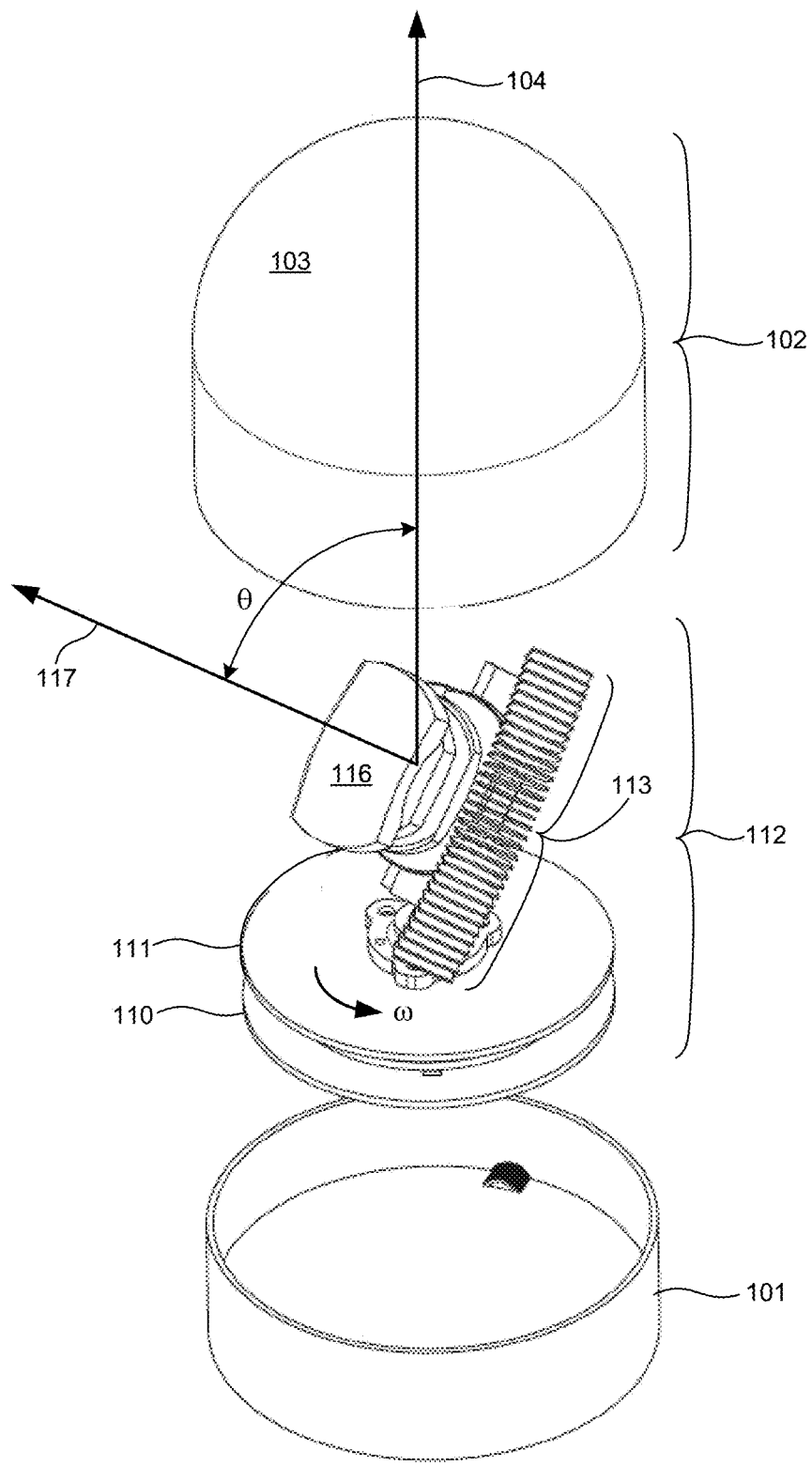
FIG. 11 depicts an exploded view of 3-D LIDAR system 100 in one exemplary embodiment.

FIG. 11 depicts an exploded view of 3-D LIDAR system 100 in one exemplary embodiment. 3-D LIDAR system 100 further includes a light emission/collection engine 112 that rotates about central axis 104. In the embodiment depicted in FIG. 11, a central optical axis 117 of light emission/collection engine 112 is tilted at an angle, θ, with respect to central axis 104. As depicted in FIG. 11, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, ω.

As depicted in FIG. 11, light emission/collection engine 112 includes an array of integrated LIDAR measurement devices 113. In one aspect, each integrated LIDAR measurement device includes a light emitting element, a light detecting element, and associated control and signal conditioning electronics integrated onto a common substrate (e.g., printed circuit board or other electrical circuit board).

Light emitted from each integrated LIDAR measurement device passes through a series of optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 9. In general, any number of LIDAR measurement devices can be arranged to simultaneously or sequentially emit any number of light beams from 3-D LIDAR system 100. Light reflected from an object in the environment due to its illumination by a particular LIDAR measurement device is collected by optical elements 116. The collected light passes through optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

As described with reference to FIGS. 9-11, an array of integrated LIDAR measurement devices is mounted to a rotating frame of the LIDAR device. This rotating frame rotates with respect to a base frame of the LIDAR device. However, in general, an array of integrated LIDAR measurement devices may be movable in any suitable manner (e.g., gimbal, pan/tilt, etc.) or fixed with respect to a base frame of the LIDAR device.

In a further aspect, each integrated LIDAR measurement device mounted to a rotating frame as described with reference to FIGS. 9-11, or otherwise moved with respect to a base frame of the LIDAR system, emits a beam of illumination light toward an optical phase modulation device as described herein. The interaction of the beam of illumination light with the optical phase modulation device scans the illumination beam into the surrounding environments in different directions in addition to the nominal movement of the illumination beam provided by the motion of the integrated LIDAR measurement device relative to the based frame of the LIDAR system. In these examples, the optical phase modulation device is mounted in a fixed location with respect to each corresponding integrated LIDAR measurement device. In some examples, each integrated LIDAR measurement device and corresponding optical phase modulation device is rotated about a central axis as described with reference to FIGS. 9-11. In these examples, the nominal path of the illumination beams (no change in optical phase modulation) is described with reference to FIGS. 9-11. Furthermore, each illumination beam is redirected from the nominal path in a programmed manner in accordance with changes in optical phase modulation imposed by each corresponding optical phase modulation device as described herein.

In some other embodiments, each integrated LIDAR measurement device includes a beam directing element (e.g., a scanning mirror, MEMS mirror etc.) that scans the illumination beam generated by the integrated LIDAR measurement device.

In some other embodiments, two or more integrated LIDAR measurement devices each emit a beam of illumination light toward a scanning mirror device (e.g., MEMS mirror) that reflects the beams into the surrounding environment in different directions.

Figure 12:
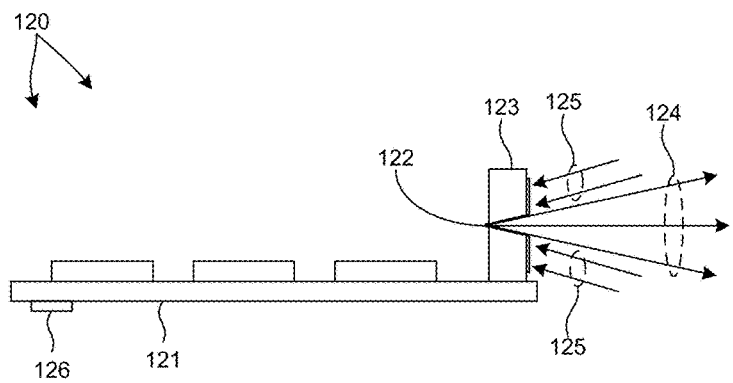
FIG. 12 depicts an integrated LIDAR measurement device 120 in another embodiment

FIG. 12 depicts an integrated LIDAR measurement device 120 in another embodiment. Integrated LIDAR measurement device 120 includes a pulsed light emitting device 122, a light detecting element 123, associated control and signal conditioning electronics integrated onto a common substrate 121 (e.g., electrical board), and connector 126. Pulsed emitting device 122 generates pulses of illumination light 124 and detector 123 detects collected light 125. Integrated LIDAR measurement device 120 generates digital signals indicative of the distance between the 3-D LIDAR system and an object in the surrounding environment based on a time of flight of light emitted from the integrated LIDAR measurement device 120 and detected by the integrated LIDAR measurement device 120. Integrated LIDAR measurement device 120 is electrically coupled to the 3-D LIDAR system via connector 126. Integrated LIDAR measurement device 120 receives control signals from the 3-D LIDAR system and communicates measurement results to the 3-D LIDAR system over connector 126.

Figure 13:
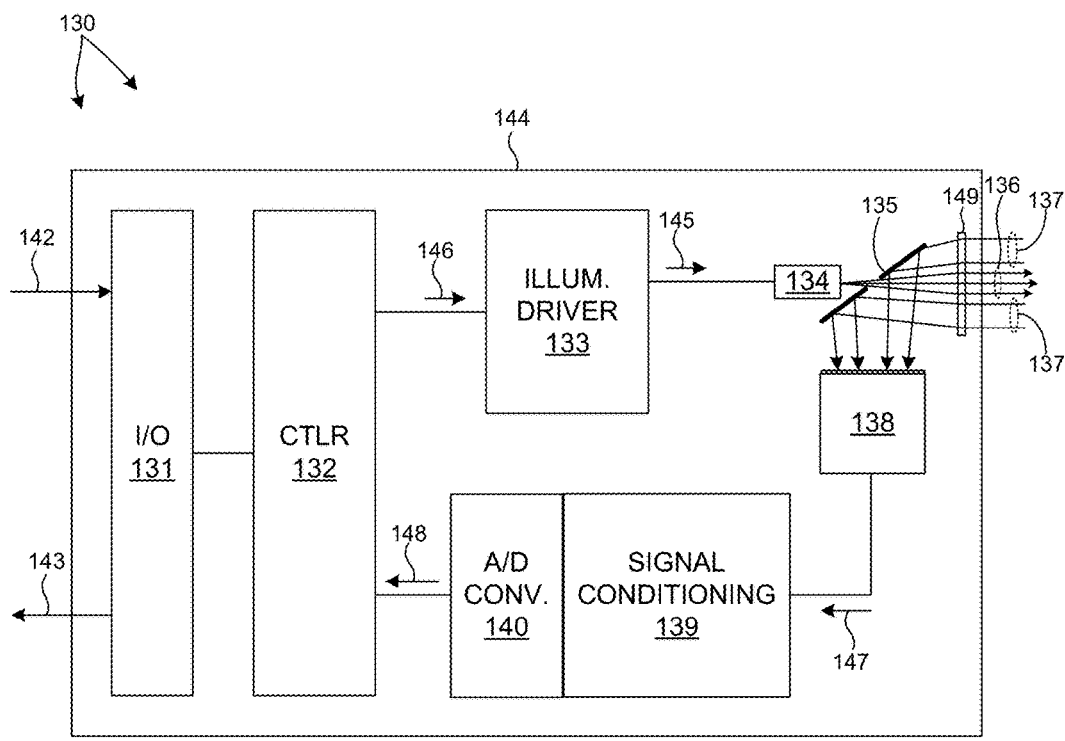
FIG. 13 depicts a schematic view of an integrated LIDAR measurement device 130 in another embodiment.

FIG. 13 depicts a schematic view of an integrated LIDAR measurement device 130 in another embodiment. Integrated LIDAR measurement device 130 includes a pulsed light emitting device 134, a light detecting element 138, a mirror 135, concentric focusing optics 149, an illumination driver 133, signal conditioning electronics 139, analog to digital (A/D) conversion electronics 140, controller 132, and digital input/output (I/O) electronics 131 integrated onto a common substrate 144. In some embodiments, these elements are individually mounted to a common substrate (e.g., printed circuit board). In some embodiments, groups of these elements are packaged together and the integrated package is mounted to a common substrate. In general, each of the elements is mounted to a common substrate to create an integrated device, whether they are individually mounted or mounted as part of an integrated package.

A measurement begins with a pulse firing signal 146 generated by controller 132. Due to internal system delay, a pulse index signal is determined by controller 132 that is shifted from the pulse firing signal 146 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.).

In some other embodiments, no index pulse signal is employed. Instead, a signal is picked up by the detector when the laser diode fires due to optical crosstalk. This signal ramps quickly and saturates the detector. In some embodiments, the leading edge of this signal is employed as the start time of the time of flight measurement. In a further embodiment, the differential output signal of the transimpedance amplifier 138 are added together. This resulting signal includes the non-common mode noise due to the laser discharge.

A return signal 147 is detected by the LIDAR system in response to the illumination of a particular location. A measurement window (i.e., a period of time over which collected return signal data is associated with a particular measurement pulse) is initiated by enabling data acquisition from detector 138. Controller 132 controls the timing of the measurement window to correspond with the window of time when a return signal is expected in response to the emission of a measurement pulse sequence. In some examples, the measurement window is enabled at the point in time when the measurement pulse sequence is emitted and is disabled at a time corresponding to the time of flight of light over a distance that is substantially twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

In one example, return signal 147 includes two return measurement pulses that correspond with the emitted measurement pulse. In general, signal detection is performed on all detected measurement pulses. Further signal analysis may be performed to identify the closest signal (i.e., first instance of the return measurement pulse), the strongest signal, and the furthest signal (i.e., last instance of the return measurement pulse in the measurement window). Any of these instances may be reported as potentially valid distance measurements by the LIDAR system. For example, a time of flight, $TOF_1$, may be calculated from the closest (i.e., earliest) return measurement pulse that corresponds with the emitted measurement pulse.

In some embodiments, the signal analysis is performed by controller 132, entirely. In these embodiments, signals 143 communicated from integrated LIDAR measurement device 130 include an indication of the distances determined by controller 132. In some embodiments, signals 143 include the digital signals 148 generated by A/D converter 140. These raw measurement signals are processed further by one or more processors located on board the 3-D LIDAR system, or external to the 3-D LIDAR system to arrive at a measurement of distance. In some embodiments, controller 132 performs preliminary signal processing steps on signals 148 and signals 143 include processed data that is further processed by one or more processors located on board the 3-D LIDAR system, or external to the 3-D LIDAR system to arrive at a measurement of distance.

In some embodiments a 3-D LIDAR system includes multiple integrated LIDAR measurement devices, such as the LIDAR systems illustrated in FIGS. 9-11. In some embodiments, a delay time is set between the firing of each integrated LIDAR measurement device. Signal 142 includes an indication of the delay time associated with the firing of integrated LIDAR measurement device 130. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

Illumination driver 133 generates a pulse electrical current signal 145 in response to pulse firing signal 146. Pulsed light emitting device 134 generates pulsed light emission 136 in response to pulsed electrical current signal 145. The illumination light 136 is focused and projected onto a particular location in the surrounding environment by one or more optical elements of the LIDAR system (not shown).

In some embodiments, the pulsed light emitting device is laser based (e.g., laser diode). In some embodiments, the pulsed illumination sources are based on one or more light emitting diodes. In general, any suitable pulsed illumination source may be contemplated.

In some embodiments, digital I/O 131, timing logic 132, A/D conversion electronics 140, and signal conditioning electronics 139 are integrated onto a single, silicon-based microelectronic chip. In another embodiment, these same elements are integrated into a single gallium-nitride or silicon based circuit that also includes the illumination driver. In some embodiments, the A/D conversion electronics and controller 132 are combined as a time-to-digital converter.

Return light 137 reflected from the surrounding environment is detected by light detector 138. In some embodiments, light detector 138 is an avalanche photodiode. Light detector 138 generates an output signal 147 that is amplified by signal conditioning electronics 139. In some embodiments, signal conditioning electronics 139 includes an analog trans-impedance amplifier. However, in general, the amplification of output signal 147 may include multiple, amplifier stages. In this sense, an analog trans-impedance amplifier is provided by way of non-limiting example, as many other analog signal amplification schemes may be contemplated within the scope of this patent document.

The amplified signal is communicated to A/D converter 140. The digital signals are communicated to controller 132. Controller 132 generates an enable/disable signal employed to control the timing of data acquisition by ADC 140 in concert with pulse firing signal 146.

As depicted in FIG. 13, the illumination light 136 emitted from integrated LIDAR measurement device 130 and the return light 137 directed toward integrated LIDAR measurement device share a common optical path on the integrated LIDAR measurement device 130 before exiting the integrated LIDAR measurement device 130 into the surrounding environment. In the embodiment depicted in FIG. 13, return light 137 is focused by concentric focusing optics 149 and reflects from mirror 135 toward the active area of detector 138. In one aspect, mirror 135 includes a slot through which light emitted from pulsed light emitting device 134 is passed. Illumination light 136 is emitted from pulsed light emitting device 134, passes through the slot in mirror 135, is collimated by concentric focusing optics 149, and exits the integrated LIDAR measurement device. In this manner, the injection of the illumination light 136 into the acceptance cone of return light 137 ensures that the illumination light 136 emitted from integrated LIDAR measurement device 130 and corresponding return measurement light 137 directed toward the integrated LIDAR measurement device share a common optical path on the integrated LIDAR measurement device 130 before exiting the integrated LIDAR measurement device 130 into the surrounding environment.

In some other embodiments, return light is separated from the illumination light by a polarizing beam splitter (PBS). A non-polarizing beam splitter may also be employed, but this generally would result in an additional loss of light. In this embodiment, the light emitted from pulsed light emitting device is polarized such that the illumination light passes through PBS. However, return light generally includes a mix of polarizations. Thus, the PBS directs a portion of the return light toward the detector and a portion of the return light toward the pulsed light emitting device. In some embodiments, it is desirable to include a quarter waveplate after the PBS. This is advantageous in situations when the polarization of the return light is not significantly changed by its interaction with the environment. Without the quarter waveplate, the majority of the return light would pass through the PBS and be directed toward the pulsed light emitting device, which is undesireable. However, with the quarter waveplate, the majority of the return light will pass through the PBS and be directed toward the detector.

However, in general, when the polarization of the return light is completely mixed and a single PBS is employed, half of the return light will be directed toward the detector, and the other half will be directed toward the pulse light emitting device, regardless of whether a quarter waveplate is used. To avoid the loss of return light associated with a polarizing beam splitter, the slotted mirror 135 described with reference to FIG. 13 is preferred.

Master controller 290 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 292 implementing methods such as those described herein may be transmitted over a transmission medium such as a wire, cable, or wireless transmission link. For example, as illustrated in FIG. 1, program instructions 292 stored in memory 291 are transmitted to processor 295 over bus 294. Program instructions 292 are stored in a computer readable medium (e.g., memory 291). Exemplary computer-readable media include read-only memory, a random access memory, a magnetic or optical disk, or a magnetic tape.

Computing system 300 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 304 implementing methods such as those described herein may be transmitted over a transmission medium such as a wire, cable, or wireless transmission link. For example, as illustrated in FIGS. 9-11, program instructions 304 stored in memory 302 are transmitted to processor 301 over bus 303. Program instructions 304 are stored in a computer readable medium (e.g., memory 302). Exemplary computer-readable media include read-only memory, a random access memory, a magnetic or optical disk, or a magnetic tape.

Figure 14:
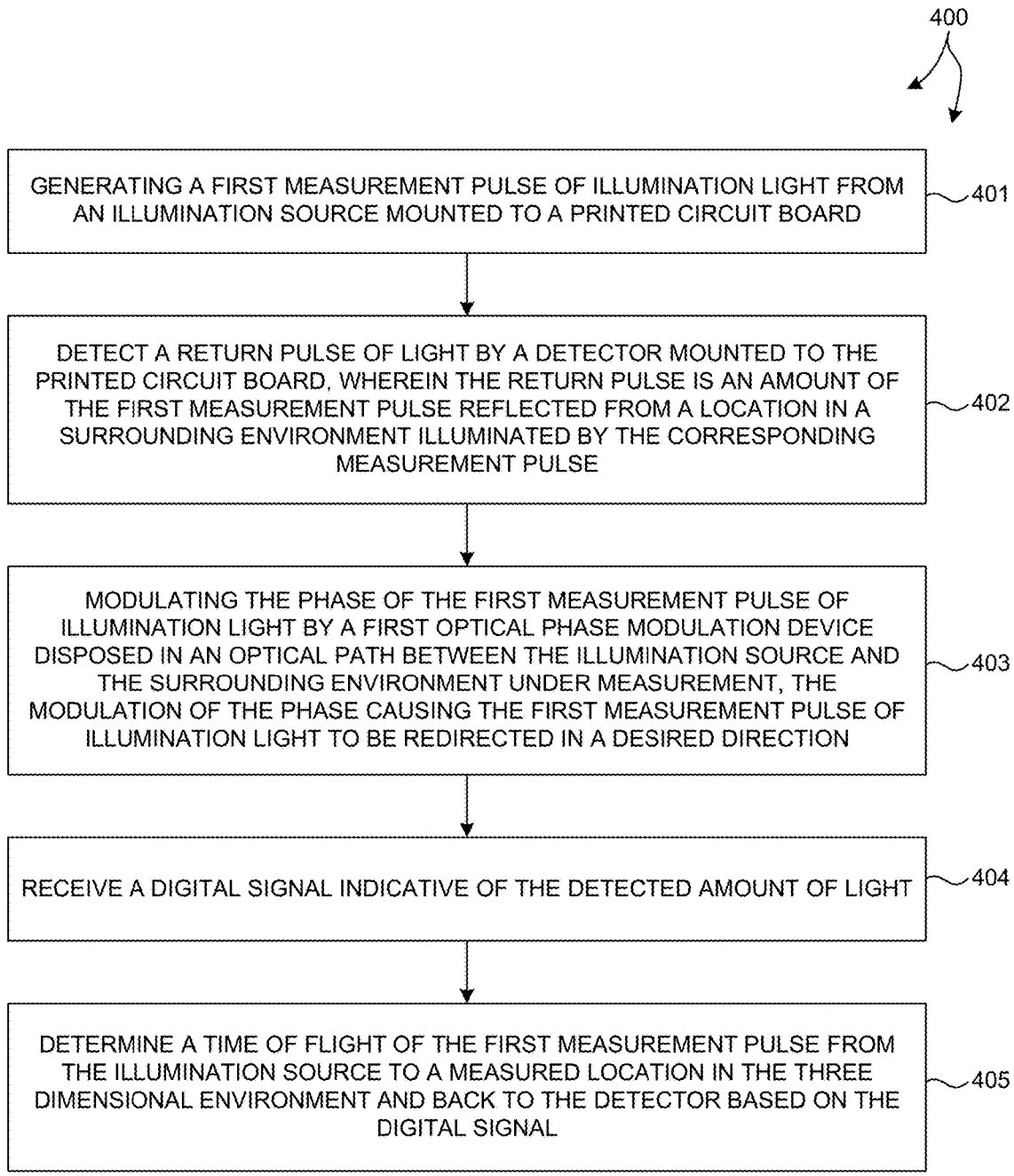
FIG. 14 depicts a flowchart illustrative of a method 400 of performing LIDAR measurements based on measurement beams scanned by an optical phase modulation device in at least one novel aspect.

FIG. 14 illustrates a flowchart of a method 400 suitable for implementation by a LIDAR system as described herein. In some embodiments, LIDAR systems 10, 100, 160, 170, 180, and 200 are operable in accordance with method 400 illustrated in FIG. 14. However, in general, the execution of method 400 is not limited to the embodiments of LIDAR systems 10, 100, 160, 170, 180, and 200 described herein. These illustrations and corresponding explanation are provided by way of example as many other embodiments and operational examples may be contemplated.

In block 401, a first measurement pulse of illumination light is generated by an illumination source mounted to a printed circuit board.

In block 402, a return pulse of light is detected by a detector mounted to the printed circuit board. The return pulse is an amount of the first measurement pulse reflected from a location in a surrounding environment illuminated by the corresponding measurement pulse.

In block 403, the phase of the first measurement pulse of illumination light is modulated by a first optical phase modulation device disposed in an optical path between the illumination source and the surrounding environment under measurement. The modulation of the phase causes the first measurement pulse of illumination light to be redirected in a desired direction.

In block 404, a digital signal indicative of the detected amount of light is received.

In block 405, a time of flight of the first measurement pulse from the illumination source to a measured location in the three dimensional environment and back to the detector is determined based on the digital signal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) system, comprising:
   a first integrated LIDAR measurement device comprising:
      an illumination source mounted to a printed circuit board, the illumination source configured to generate a measurement pulse of illumination light;
      a detector mounted to the printed circuit board, the detector configured to detect a return pulse of light and generate an output signal indicative of the detected return pulse, wherein the return pulse is an amount of the measurement pulse reflected from a location in a surrounding environment illuminated by the corresponding measurement pulse, wherein the measurement pulse of illumination light and the return pulse share a common optical path over a distance within the first integrated LIDAR device;
      an illumination driver mounted to the printed circuit board, the illumination driver electrically coupled to the illumination source and configured to provide an amount of electrical power to the illumination source that causes the illumination source to emit the measurement pulse of illumination light;
      an amount of analog signal conditioning electronics mounted to the printed circuit board, the analog signal conditioning electronics configured to amplify the output signal generated by the detector;
      an analog to digital converter mounted to the printed circuit board, the analog to digital converter configured to convert the amplified output signal to a digital signal;
   an optical phase modulation device disposed in an optical path between the first integrated LIDAR measurement device and the surrounding environment under measurement, the optical phase modulation device configured to redirect the incident measurement pulse of illumination light in any of a plurality of different directions; and
   a computing system configured to:
      communicate a control signal to the optical phase modulation device that causes the optical phase modulation device to redirect the incident measurement pulse beam to one of the plurality of different directions;
      receive the digital signal indicative of the detected amount of light; and
      determine a time of flight of the measurement pulse from the LIDAR device to the measured location in the three dimensional environment and back to the LIDAR device based on the digital signal.

2. The LIDAR system of claim 1, further comprising:
   a second integrated LIDAR measurement device configured to generate a measurement pulse of illumination light, wherein the optical phase modulation device is disposed in an optical path between the second integrated LIDAR measurement device and the surrounding environment under measurement, the optical phase modulation device configured to redirect the incident measurement pulse of illumination light from the second integrated LIDAR measurement device in any of a plurality of different directions.

3. The LIDAR system of claim 1, further comprising:
a second integrated LIDAR measurement device configured to generate a measurement pulse of illumination light; and
a second optical phase modulation device disposed in an optical path between the second integrated LIDAR measurement device and the surrounding environment under measurement, the optical phase modulation device configured to redirect the incident measurement pulse of illumination light from the second integrated LIDAR measurement device in any of a plurality of different directions.

4. The LIDAR system of claim 2, further comprising:
one or more focusing optical elements disposed in an optical path between the first integrated LIDAR measurement device and the first optical phase modulation device; and
one or more condensing optical elements disposed in an optical path between the first optical phase modulation device and the surrounding environment under measurement.

5. The LIDAR system of claim 1, wherein the computing system is further configured to:
communicate a control signal to the first integrated LIDAR measurement device that synchronizes an emission of the measurement pulse of illumination light with a change of physical state of the optical phase modulation device.

6. The LIDAR system of claim 1, further comprising:
a base frame; and
a rotating frame that rotates with respect to the base frame, wherein the first integrated LIDAR measurement device and the optical phase modulation device are fixed with respect to the rotating frame.

7. The LIDAR system of claim 1, wherein the optical phase modulation device is a one dimensional optical phase modulation device, wherein the measurement pulse of illumination light is focused to one dimension before interaction with the optical phase modulation device.

8. The LIDAR system of claim 1, wherein the optical phase modulation device is a two dimensional optical phase modulation device.

9. The LIDAR system of claim 1, wherein the measurement beam of illumination light provided by the illumination source of the first integrated LIDAR measurement device is injected into a reception code of the detector by a fiber waveguide.

10. The LIDAR system of claim 1, wherein the time of flight is determined based on the time elapsed between a first detected pulse signal due to internal cross-talk between the illumination source and the detector and a second detected pulse signal.

11. A light detection and ranging (LIDAR) system, comprising:
a first integrated LIDAR measurement device comprising:
an illumination source mounted to a printed circuit board, the illumination source configured to generate a measurement pulse of illumination light;
a detector mounted to the printed circuit board, the detector configured to detect a return pulse of light and generate an output signal indicative of the detected return pulse, wherein the return pulse is an amount of the measurement pulse reflected from a location in a surrounding environment illuminated by the corresponding measurement pulse, wherein the measurement pulse of illumination light and the return pulse share a common optical path over a distance within the first integrated LIDAR device;
an optical phase modulation device disposed in an optical path between the first integrated LIDAR measurement device and the surrounding environment under measurement, the optical phase modulation device configured to redirect the incident measurement pulse of illumination light in any of a plurality of different directions; and
a non-transient computer-readable medium comprising computer-readable instructions that when executed by one or more processors cause the one or more processors to:
communicate a control signal to the optical phase modulation device that causes the optical phase modulation device to change of physical state of the optical phase modulation device and redirect the incident measurement pulse beam to one of the plurality of different directions; and
communicate a control signal to the first integrated LIDAR measurement device that synchronizes an emission of the measurement pulse of illumination light with the change of physical state of the optical phase modulation device.

12. The LIDAR system of claim 11, further comprising:
a second integrated LIDAR measurement device configured to generate a measurement pulse of illumination light, wherein the optical phase modulation device is disposed in an optical path between the second integrated LIDAR measurement device and the surrounding environment under measurement, the optical phase modulation device configured to redirect the incident measurement pulse of illumination light from the second integrated LIDAR measurement device in any of a plurality of different directions.

13. The LIDAR system of claim 12, further comprising:
one or more focusing optical elements disposed in an optical path between the first integrated LIDAR measurement device and the first optical phase modulation device; and
one or more condensing optical elements disposed in an optical path between the first optical phase modulation device and the surrounding environment under measurement.

14. The LIDAR system of claim 11, further comprising:
a second integrated LIDAR measurement device configured to generate a measurement pulse of illumination light; and
a second optical phase modulation device disposed in an optical path between the second integrated LIDAR measurement device and the surrounding environment under measurement, the optical phase modulation device configured to redirect the incident measurement pulse of illumination light from the second integrated LIDAR measurement device in any of a plurality of different directions.

15. The LIDAR system of claim 11, further comprising:
a base frame; and
a rotating frame that rotates with respect to the base frame, wherein the first integrated LIDAR measurement device and the optical phase modulation device are fixed with respect to the rotating frame.

16. The LIDAR system of claim 11, wherein the optical phase modulation device is a one dimensional optical phase modulation device, wherein the measurement pulse of illumination light is focused to one dimension before interaction with the optical phase modulation device.

17. The LIDAR system of claim 11, wherein the optical phase modulation device is a two dimensional optical phase modulation device.

18. The LIDAR system of claim 11, wherein the measurement beam of illumination light provided by the illumination source of the first integrated LIDAR measurement device is injected into a reception code of the detector by a fiber waveguide.

19. A method comprising:
generating a first measurement pulse of illumination light from an illumination source mounted to a printed circuit board;
detecting a return pulse of light by a detector mounted to the printed circuit board, wherein the return pulse is an amount of the first measurement pulse reflected from a location in a surrounding environment illuminated by the corresponding measurement pulse;
modulating the phase of the first measurement pulse of illumination light by a first optical phase modulation device disposed in an optical path between the illumination source and the surrounding environment under measurement, the modulation of the phase causing the first measurement pulse of illumination light to be redirected in a desired direction;
receiving a digital signal indicative of the detected amount of light; and
determining a time of flight of the first measurement pulse from the illumination source to a measured location in the three dimensional environment and back to the detector based on the digital signal.

20. The method of claim 19, further comprising:
synchronizing the generating of the first measurement pulse of illumination light with the modulating of the phase of the first measurement pulse.

21. The method of claim 19, further comprising:
rotating the printed circuit board and the optical phase modulation device with respect to a base frame, the printed circuit board and the first optical phase modulation device fixed with respect a rotating frame.

22. The method of claim 19, further comprising:
focusing the first measurement pulse of illumination light to one dimension before interaction with the first optical phase modulation device.

23. The method of claim 19, further comprising:
injecting the first measurement pulse of illumination light provided by the illumination source into a reception cone of the detector by a fiber waveguide.

24. The method of claim 19, wherein the determining of the time of flight involves determining a time elapsed between a first detected pulse signal due to internal crosstalk between the illumination source and the detector and a second detected pulse signal.

25. The method of claim 19, further comprising:
generating a second measurement pulse of illumination light from a second illumination source; and
modulating the phase of the second measurement pulse of illumination light by the first optical phase modulation device disposed in an optical path between the second illumination source and the surrounding environment under measurement, the modulation of the phase causing the second measurement pulse of illumination light to be redirected.

26. The method of claim 19, further comprising:
generating a second measurement pulse of illumination light from a second illumination source; and
modulating the phase of the second measurement pulse of illumination light by a second optical phase modulation device disposed in an optical path between the second illumination source and the surrounding environment under measurement, the modulation of the phase causing the second measurement pulse of illumination light to be redirected.

* * * * *